United States Patent
Chae et al.

(10) Patent No.: US 8,244,294 B2
(45) Date of Patent: Aug. 14, 2012

(54) CHARACTER INPUT APPARATUS AND METHOD FOR MOBILE TERMINAL

(75) Inventors: Byung-Kee Chae, Daegu (KR); Hyun-Dong Yang, Seoul (KR); Man-Soo Shin, Seoul (KR)

(73) Assignee: LG Electronics Inc., Seoul (KR)

( * ) Notice: Subject to any disclaimer, the term of this patent is extended or adjusted under 35 U.S.C. 154(b) by 836 days.

(21) Appl. No.: 12/316,275

(22) Filed: Dec. 10, 2008

(65) Prior Publication Data

US 2009/0176532 A1    Jul. 9, 2009

(30) Foreign Application Priority Data

Dec. 10, 2007  (KR) .................... 10-2007-0127805
Jan. 4, 2008   (KR) .................... 10-2008-0001446

(51) Int. Cl.
*H04M 1/00* (2006.01)

(52) U.S. Cl. ............. 455/550.1; 455/566; 345/168; 345/169

(58) Field of Classification Search .... 455/550.1–556.2, 455/566; 345/168, 169
See application file for complete search history.

(56) References Cited

U.S. PATENT DOCUMENTS

| | | | |
|---|---|---|---|
| 2004/0250217 A1* | 12/2004 | Tojo et al. ............... | 715/810 |
| 2006/0007129 A1* | 1/2006 | Pletikosa ............... | 345/156 |
| 2006/0063558 A1* | 3/2006 | Scott ............... | 455/550.1 |
| 2007/0205990 A1* | 9/2007 | Gloyd et al. ............ | 345/169 |
| 2008/0086704 A1* | 4/2008 | Aravamudan ............ | 715/854 |
| 2009/0048000 A1* | 2/2009 | Ade-Hall ............... | 455/566 |
| 2009/0247220 A1* | 10/2009 | Cho et al. .............. | 455/556.1 |
| 2010/0090958 A1* | 4/2010 | Perez et al. ............. | 345/169 |
| 2010/0131900 A1* | 5/2010 | Spetalnick ............. | 715/825 |

* cited by examiner

*Primary Examiner* — Lester Kincaid
*Assistant Examiner* — Mehmood B Khan
(74) *Attorney, Agent, or Firm* — Lee, Hong, Degerman, Kang & Waimey

(57) ABSTRACT

A method for effectively inputting characters in an ultra-compact mobile terminal is disclosed. When the mobile terminal enters a character input mode, one of a plurality of key groups having at least one key block is displayed by manipulation a scroll key in an up or down direction, and characters of the key blocks are displayed. Characters of the displayed key blocks and one character is selected using one of two selection keys or the scroll key operated in a push direction. Several characters are displayed in each of the key blocks and a character is selected by manipulating one of the two selection keys or pushing the scroll key a number of times. The selected character is displayed on a display unit.

30 Claims, 16 Drawing Sheets

FIG. 8
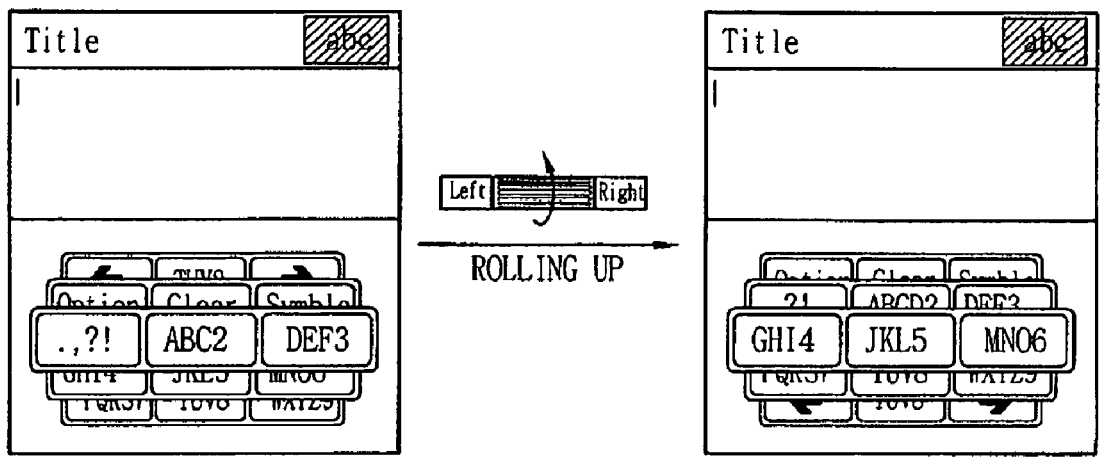
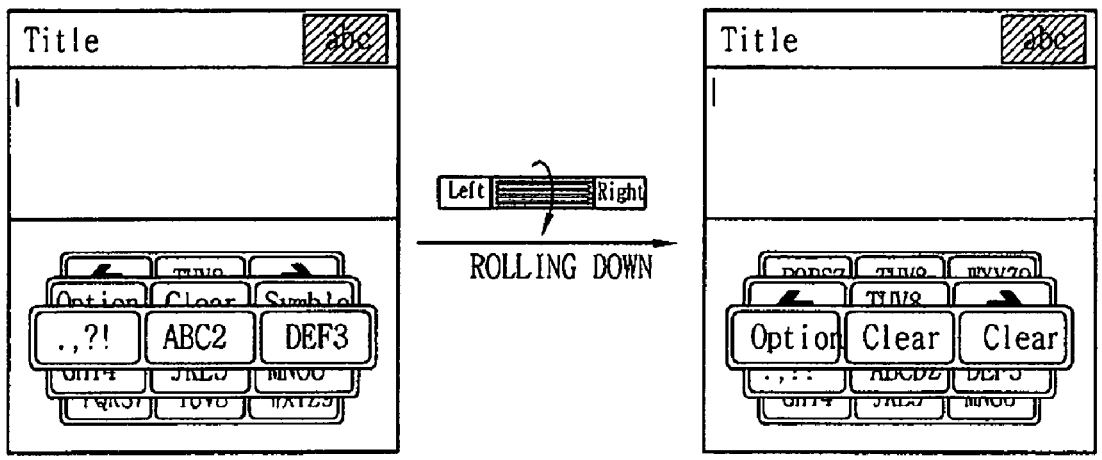

CHARACTER INPUT APPARATUS AND METHOD FOR MOBILE TERMINAL

CROSS REFERENCE TO RELATED APPLICATIONS

The present application claims priority to Korean Application No. 10-2007-0127805 filed in Korea on Dec. 10, 2007, and Korean Application No. 10-2008-0001446 filed in Korea on Jan. 4, 2008, the entire contents of which is hereby incorporated by reference in its entirety.

FIELD OF THE INVENTION

The present invention relates to a mobile terminal and a method for inputting characters by using a minimum number of keys in a mobile terminal that does not include a dedicated keypad.

DESCRIPTION OF THE RELATED ART

A mobile terminal is a device that may be configured to perform various functions including data and voice communications, capturing images and video from a camera, recording audio, playing music files on a speaker system, and displaying images and video on a display. Some terminals include additional functions that support game playing, while other terminals are configured as multimedia players. More recently, mobile terminals have been configured to receive broadcast and multicast signals permitting viewing of content such as videos and television programs.

Current trends are to increase the functions of mobile terminals, and to incorporate hardware, software, and structural improvements. Besides having more functions, mobile terminals are becoming more compact, thinner, and lighter. A terminals may be a folder type, slide type, bar type, rotation type, or wrist watch-type.

The ultra-compact mobile terminal, such as a watch phone, by necessity is small for wearing on a wrist, and does not include a keypad similar to those used in general mobile terminals.

In an ultra-compact mobile terminal, characters are inputted by using a touch key or an external remote keypad. However, the touch key is disadvantageous in that the response speed is not fast, and the use of a remote keypad is inconvenient.

SUMMARY OF THE INVENTION

Accordingly, one object of the present invention is to address the above-noted and other problems. Another object of the present invention is to provide an ultra-compact mobile terminal that does not does not include a dedicated keypad, for inputting characters by using the smallest number of keys, and its method. Still another object of the present invention is to provide an ultra-compact mobile terminal for conveniently displaying menus and changing screen images and its method.

To achieve these and other advantages and in accordance with the purpose of the present invention, as embodied and broadly described herein, the present invention provides in one aspect a mobile terminal including a memory for storing a plurality of key groups wherein each key group comprises at least one key block and wherein each key block comprises at least one character, a user input unit for generating key input data, a controller for selecting one of the plurality of key groups, selecting one of the key blocks associated with the selected key group, and selecting a character of the selected key block according to the key input data, and a display unit for displaying the key blocks associated with the selected key group and the selected character.

The user input unit may include a scroll key, a left selection key, and a right selection key, wherein scroll key is operable in an up rotational direction, a down rotational direction, and a push direction.

Operating the scroll key in one of the up and the down rotational directions displays and selects one of the plurality of key groups, and operating the left selection key, operating the scroll wheel in the push direction, or operating the right selection key selects one of the key blocks associated with the selected key group. One character of the selected key block is selected according to multiple operations of the left selection key, the scroll wheel in the push direction, or the right selection key.

The key blocks are divided into key blocks for inputting characters and key blocks for performing text functions.

In another embodiment, a mobile terminal has a memory for storing a character pattern table, a user input unit comprising a scroll key for selecting a character to be inputted, and a controller for displaying characters by mapping the characters to the character pattern table according to a manipulation direction of the scroll key when the mobile terminal is in a character input mode, and displaying one of the characters on a display unit when the character is selected.

When the scroll key is manipulated in a first direction, the controller selects and displays a key block, and when the scroll key is manipulated in a second direction, the controller displays a character list for the selected key block. Also, when the scroll key is manipulated in one direction, the controller displays odd numbers, and when the scroll key is manipulated in another direction, the controller displays even numbers.

The display unit includes a first display region for displaying the selected character and a second display region for displaying a plurality of characters mapped according to the manipulation direction of the scroll key.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The invention will be described in detail with reference to the following drawings in which like numerals refer to like elements. The accompany drawings, which are included to provide a further understanding of the invention and are incorporated in and constitute a part of this specification, illustrate embodiments of the invention and together with the description serve to explain the principles of the invention.

FIG. 8 shows an example of selecting one of a plurality of key groups by manipulating a scroll key in FIG. 7.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. It is to be understood by those of ordinary skill in this technological field that other embodiments may be utilized, and structural, electrical, as well as procedural changes may be made without departing from the scope of the present invention.

Figure 1:
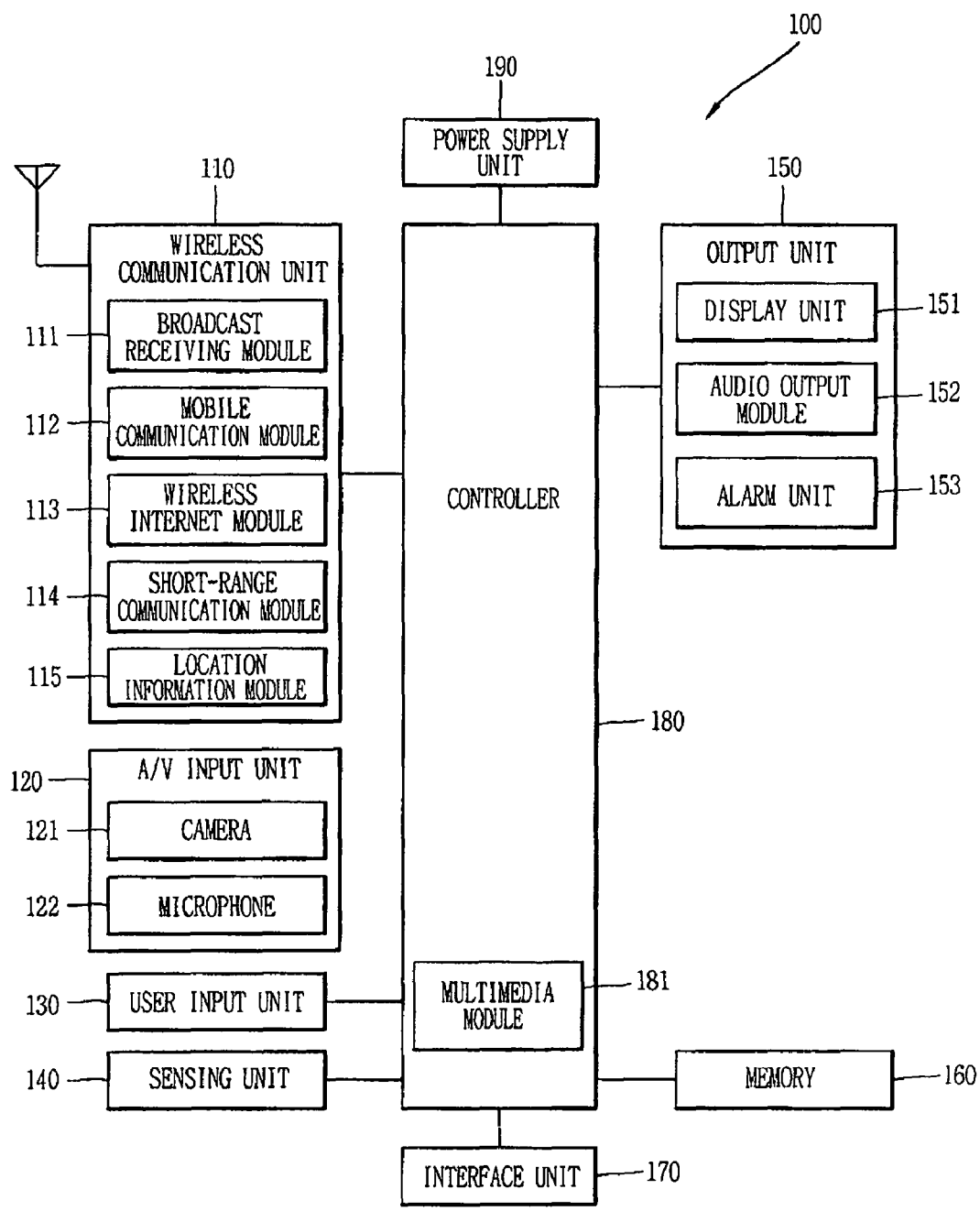
FIG. 1 is a block diagram of a mobile terminal in accordance with an embodiment of the present invention.

FIG. 1 is a block diagram of mobile terminal 100 in accordance with an embodiment of the present invention. The mobile terminal may be implemented using a variety of different types of terminals including mobile phones, user equipment, smart phones, computers, digital broadcast terminals, personal digital assistants, portable multimedia players (PMP), and navigators. By way of non-limiting example only, further description will be with regard to a mobile terminal. However, such teachings apply equally to other types of terminals. FIG. 1 shows the mobile terminal 100 having various components, but it is understood that implementing all of the illustrated components is not a requirement. Greater or fewer components may alternatively be implemented.

The elements of the mobile terminal will be described in detail as follows. The wireless communication unit 110 typically includes one or more components allowing radio communication between the mobile terminal 100 and a wireless communication system or a network in which the mobile terminal is located. For example, the wireless communication unit 110 may include a broadcast receiving module 111, a mobile communication module 112, a wireless Internet module 113, a short-range communication module 114, and a location information module 115.

The broadcast receiving module 111 receives a broadcast signal and/or broadcast associated information from an external broadcast managing entity via a broadcast channel. The broadcast channel may include a satellite channel and a terrestrial channel. The broadcast managing entity refers generally to a system which transmits a broadcast signal and/or broadcast associated information. Examples of broadcast associated information include information associated with a broadcast channel, a broadcast program, a broadcast service provider. For instance, broadcast associated information may include an electronic program guide (EPG) of digital multimedia broadcasting (DMB) and electronic service guide (ESG) of the digital video broadcast-handheld (DVB-H).

The broadcast signal may be implemented as a TV broadcast signal, a radio broadcast signal, and a data broadcast signal. If desired, the broadcast signal may further include a broadcast signal combined with a TV or radio broadcast signal.

The broadcast receiving module 111 may be configured to receive broadcast signals transmitted from various types of broadcast systems. By a nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®), and integrated services digital broadcast-terrestrial (ISDB-T). Receiving multicast signals is also possible. If desired, data received by the broadcast receiving module 111 may be stored in a suitable device, such as memory 160.

The mobile communication module 112 transmits and/or receives radio signals to and/or from at least one of a base station (e.g., access points, Node Bs, etc.), an external terminal (e.g., other user devices) and a server (or other network entities). Such radio signals may include a voice call signal, a video call signal or various types of data according to text and/or multimedia message transmission and/or reception.

The wireless Internet module 113 supports Internet access for the mobile terminal. This module may be internally or externally coupled to the terminal.

The short-range communication module 114 refers to a module for supporting short range communications. Some examples of short-range communication technology include Bluetooth™, Radio Frequency Identification (RFID), Infrared Data Association (IrDA), Ultra-WideBand (UWB), Zig-Bee™.

Position-location module 115 identifies or otherwise obtains the location of the mobile terminal. If desired, this module may be implemented using global positioning system (GPS) components which cooperate with associated satellites, network components, and combinations thereof.

The A/V input unit 120 is configured to receive an audio or video signal. The A/V input unit 120 may include a camera 121 (or other image capture device) and a microphone 122 (or other sound pick-up device). The camera 121 processes image data of still pictures or videos obtained by an image capture device in a video capturing mode or an image capturing mode. The processed image frames may be displayed on a display unit 151 (or other visual output device).

The image frames processed by the camera 121 may be stored in the memory 160 (or other storage medium) or transmitted via the wireless communication unit 110. Two or more cameras 121 may be provided according to the configuration of the mobile terminal.

The microphone 122 receives an external audio signal while the portable device is in a particular mode, such as a phone call mode, recording mode, and voice recognition mode. This audio signal is processed and converted into digital data. The portable device, and in particular, A/V input unit 120, typically includes assorted noise removing algorithms to remove noise generated in the course of receiving the external audio signal. Data generated by the A/V input unit 120 may be stored in memory 160, utilized by output unit 150, or transmitted via one or more modules of communication unit 110. If desired, two or more microphones and/or cameras may be used.

The user input unit 130 (or other user input device) may generate key input data from commands entered by a user to control various operations of the mobile terminal. The user input unit 130 allows the user to enter various types of information, and may include a keypad, a dome switch, a touch pad (e.g., a touch sensitive member that detects changes in resistance, pressure, capacitance, etc.), a jog wheel, a jog switch, and the like. In particular, when the touch pad is overlaid on the display unit 151 in a layered manner, it may be called a touch screen.

The sensing unit 140 (or other detection means) detects a current status (or state) of the mobile terminal 100 such as an opened or closed state of the mobile terminal 100, a location of the mobile terminal 100, a presence or absence of user contact (i.e. touch inputs) with the mobile terminal 100, orientation of the mobile terminal 100, an acceleration or deceleration movement and direction of the mobile terminal 100, etc., and generates commands or signals for controlling the operation of the mobile terminal 100. For example, when the mobile terminal 100 is a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The interface unit 170 (or other connection means) serves as an interface with at least one external device connected with the mobile terminal 100. For example, the external devices may include wired or wireless headset ports, external power supply (or battery re-charger) ports, wired or wireless data ports, memory card ports, ports for connecting a device having an identification module, audio input/output (I/O) ports, video I/O ports, earphone ports, or the like.

Here, the identification module may be a chip (or other element with memory or storage capabilities) that stores various information for authenticating the authority of using the mobile terminal 100 and may include a user identity module (UIM), a subscriber identity module (SIM) a universal subscriber identity module (USIM), and the like. In addition, the device having the identification module (identifying device) may take the form of a smart card. Accordingly, the identifying device may be connected with the terminal 100 via a port or other connection means. The interface unit 170 may be used to receive inputs (e.g., data, information, power, etc.) from an external device and transfer the received inputs to one or more elements within the mobile terminal 100 or may be used to transfer data between the mobile terminal and an external device.

The output unit 150 is configured to provide outputs in a visual, audible, and/or tactile manner (e.g., audio signal, video signal, alarm signal, vibration signal, etc.). The output unit 150 may include the display unit 151, an audio output module 152, and an alarm unit 153.

The display unit 151 may output information processed in the mobile terminal 100. For example, when the mobile terminal 100 is in a phone call mode, the display unit 151 may display a User Interface (UI) or a Graphic User Interface (GUI) associated with a call or other communication (such as text messaging, multimedia file downloading, etc.). When the mobile terminal 100 is in a video call mode or image capturing mode, the display unit 151 may display a captured image and/or received image, a UI or GUI that shows videos or images and functions related thereto, and the like.

When the display unit 151 and the touch pad are overlaid in a layered manner to form a touch screen, the display unit 151 may function as both an input device and an output device. The display unit 151 may include at least one of a Liquid Crystal Display (LCD), a Thin Film Transistor-LCD (TFT-LCD), an Organic Light Emitting Diode (OLED), a flexible display, a three-dimensional (3D) display, or the like. The mobile terminal 100 may include two or more display units (or other display means) according to its embodiment. For example, the mobile terminal may include an external display unit (that can be viewed even if the mobile phone is closed) and an internal display unit (that can be viewed if the mobile phone is opened).

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed by the mobile terminal 100. The audio output module 152 may include a speaker, a buzzer, or other sound generating device.

The alarm unit 153 (or other type of user notification means) may provide outputs to inform about an occurrence of an event of the mobile terminal 100. Typical events may include call reception, message reception, key or button inputs, etc. In addition to audio or video outputs, the alarm unit 153 may provide outputs in a different manner to inform about an occurrence of an event. For example, the alarm unit 153 may provide outputs in the form of vibrations (or other tactile outputs). When a call, a message, or some other incoming communication is received, the alarm unit 153 may provide tactile outputs (i.e., vibrations) to inform the user. By providing tactile outputs, the user can recognize the occurrence of various events even if his mobile phone is in his pocket. Outputs informing about the occurrence of an event may be also provided via the display unit 151 or the audio output module 152.

The memory 160 (or other storage means) may store software programs or the like used for the processing and controlling operations performed by the controller 180, or may temporarily store data (e.g., a phonebook, messages, still images, video, etc.) that have been input or to be outputted.

The memory 160 may include at least one type of storage medium including a flash memory, a hard disk, a multimedia card, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM) magnetic memory, a magnetic disk, an optical disk, and the like. Also, the mobile terminal 100 may cooperate with a network storage device that performs the storage function of the memory 160 over a network connection.

The controller 180 (such as a microprocessor or the like) typically controls the general operations of the mobile terminal. For example, the controller 180 performs controlling and processing associated with voice calls, data communications, video calls, and the like. In addition, the controller 180 may include a multimedia module 181 for reproducing (or playing back) multimedia data. The multimedia module 181 may be configured within the controller 180 or may be configured to be separated from the controller 180.

The power supply unit 190 receives external power (via a power cable connection) or internal power (via the battery of the mobile phone) and supplies appropriate power required for operating respective elements and components under the control of the controller 180.

Various embodiments described herein may be implemented in a computer-readable medium using, for example, computer software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented in the controller 180.

For software implementation, the embodiments such as procedures or functions may be implemented together with separate software modules that allow performing of at least one function or operation. Software codes can be implemented by a software application (or program) written in any suitable programming language. The software codes may be stored in the memory 160 and executed by the controller 180.

So far, the mobile terminal has been described from the perspective of its functions. Hereinafter, external elements of the mobile terminal will be described from the perspective of their functions with reference to FIGS. 2 and 3. Mobile terminal may be implemented in a variety of different configurations. Examples of such configurations include folder-type, bar-type, swing-type, a slide type, as well as various other configurations. The following description will primarily relate to a slide-type mobile terminal. However, such description can equally apply to other types of mobile terminals.

Figure 2:
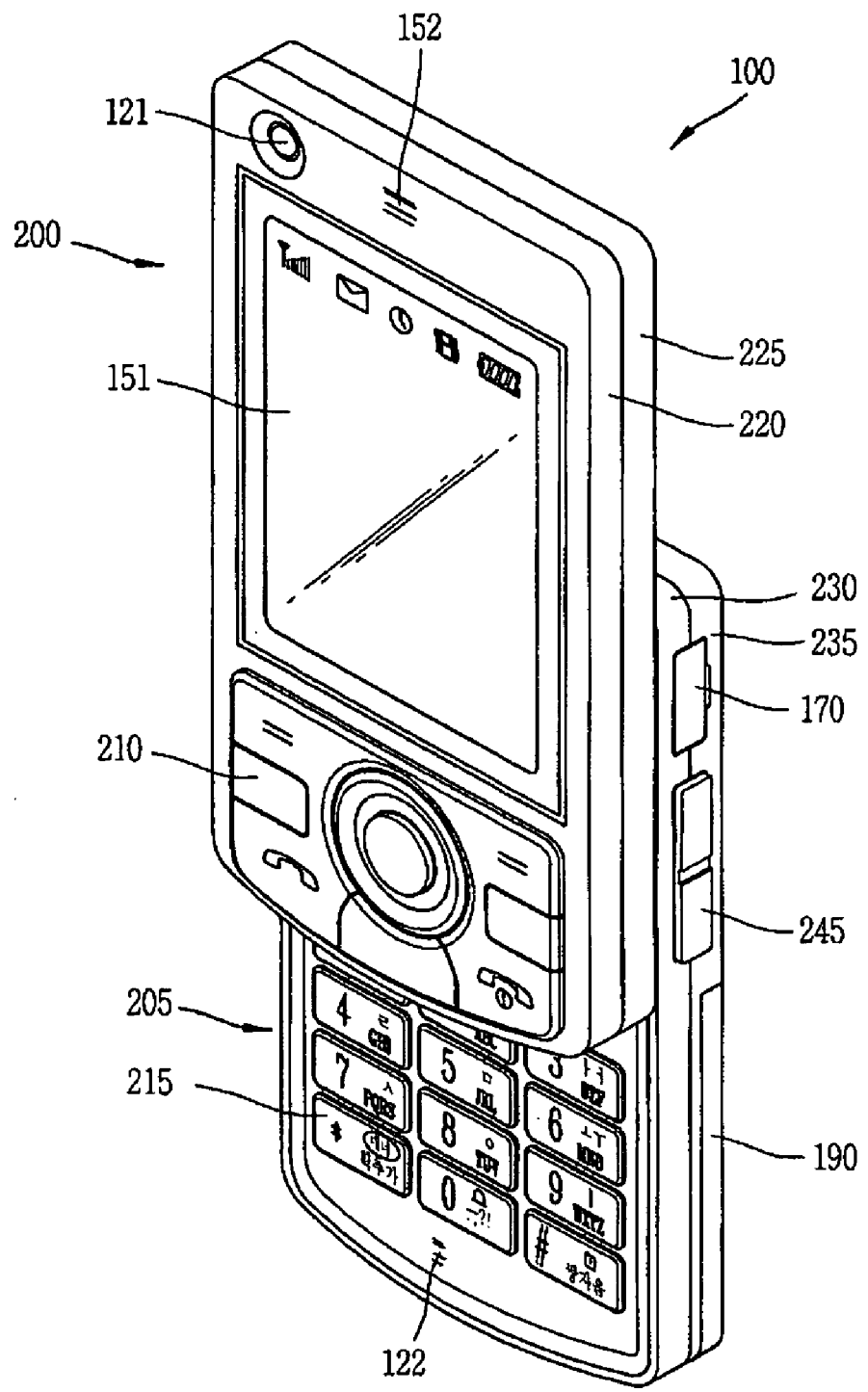
FIG. 2 is a perspective view of a front side of a mobile terminal according to an embodiment of the present invention.

FIG. 2 is a front perspective view of the mobile terminal according to an embodiment of the present invention.

Such mobile terminal may include a first body 200 and a second body 205 that can be slidably moved along at least one direction with respect to the first body 200. In case of the folder type mobile phone, it includes a second body that can be folded or unfolded with respect to the first body.

A state in which the first body is disposed to overlap with the second body 205 may be called a closed configuration, and as shown in FIG. 2, a state in which at least a portion of the second body 205 is exposed may be called an open configuration. In the closed configuration, the mobile terminal mainly operates in a standby (or idle) mode, and the standby mode may be released upon user manipulation. The mobile terminal operates mainly in the calling mode or the like in the open configuration, and it can be changed to the standby mode with the lapse of time or upon user manipulation.

The case (or casing, housing, cover, etc.) constituting the external appearance of the first body 200 may include a first front case 220 and a first rear case 225. Various electronic components are installed in the space between the first front case 220 and the first rear case 225. One or more intermediate cases may be additionally disposed between the first front case 220 and the first rear case 225.

The cases may be formed by injection-molding a synthetic resin or may be made of a metallic material such as stainless steel (STS) or titanium (Ti).

The display unit 151, the audio output module 152, the camera 121 or the first user input unit 210 may be located at the first body, 200, specifically, on the first front case 220 of the first body 200.

The display unit 151 may include an LCD (Liquid Crystal Display), an OLED (Organic Light Emitting Diode), and the like, that visually displays information.

A touch pad may be overlaid in a layered manner on the display unit 151 to allow the display unit 151 to function as a touch screen to input information via user's touch.

The audio output unit 152 may be implemented in the form of a speaker or other sound producing device.

The camera 121 may be implemented to be suitable for capturing images or video with respect to the user and other objects.

Like the first body 200, the case constituting the external appearance of the second body 205 may include a second front case 230 and a second rear case 235.

A second user input unit 215 may be disposed at a front portion of the second body 205, specifically, on the second front case 230. A third user input unit 245, the microphone 122, the interface unit 170 may be disposed on at least one of the second front case 230 and the second rear case 235.

The first to third user input units 210, 215 and 245 may be generally referred to as a manipulating unit 130, and various methods and techniques can be employed for the manipulation unit so long as they can be operated by the user in a tactile manner.

For example, the user input units 130 can be implemented as dome switches, actuators, or touch pad regions that can receive user commands or information according to the user's touch operations (e.g., pressing, pushing, swiping, drag-and-drop, etc.) or may be implemented in the form of a rotatable control wheel (or disc), keys or buttons, a jog dial, a joystick, or the like.

In terms of their functions, the first user input unit 210 is used for inputting (entering) commands such as start, end, scroll or the like, and the second user input unit 215 is used for inputting (entering) numbers, characters, symbols, or the like.

Also, the third user input unit 245 may support the so-called hot key functions that allow more convenient activation of particular functions for the mobile terminal.

The microphone 122 (or other sound pick-up device) may be appropriately implemented to detect user voice inputs, other sounds, and the like.

The interface unit 170 may be used as a communication link (or passage, path, etc.) through which the terminal can exchange data or the like with an external device. For example, the interface unit 170 may be implemented in the form of a connection port for connecting an earphone to the mobile terminal via a fixed or wireless means, a port for short-range communications (e.g., an Infrared Data Association (IrDA) port, a Bluetooth™ port, a wireless LAN port, etc.), power supply ports for providing power to the mobile terminal, or the like. Also, the interface unit 170 may be a card socket for accommodating a SIM (Subscriber Identification Module) card or a UIM (User Identity Module) card, or an external card such as a memory card for storing information.

The power supply unit 190 for supplying power to the terminal may be located at the second rear case 235. The power supply unit 190 may be, for example, a re-chargeable battery that can be detached.

Figure 3:
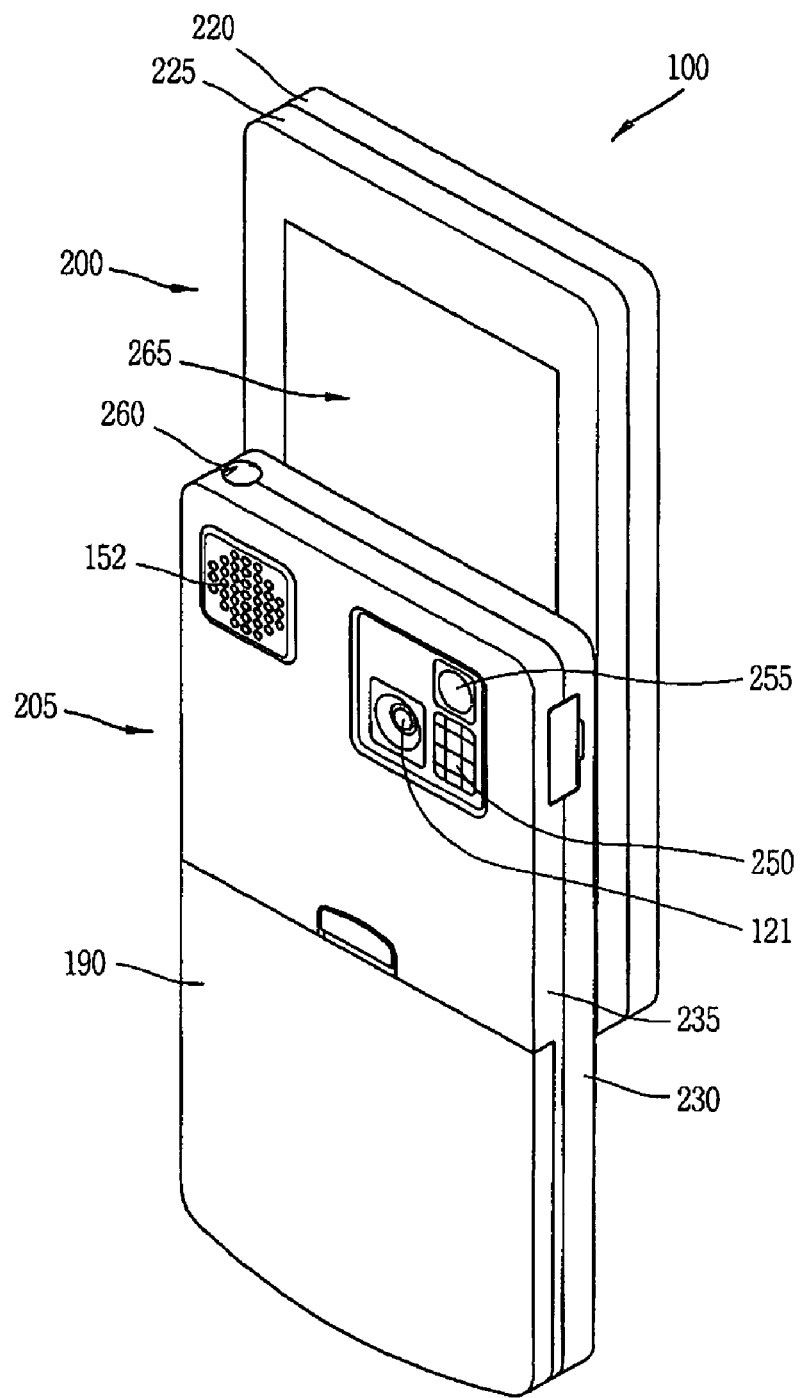
FIG. 3 is a rear view of the mobile terminal shown in FIG. 2.

FIG. 3 is a rear perspective view of the mobile terminal of FIG. 2 according to an exemplary embodiment.

As shown in FIG. 3, a camera 121 (or other image pick-up device) may additionally be disposed on a rear surface of the second rear case 235 of the second body 205. The camera 121 of the second body 205 may have an image capture direction which is substantially opposite to that of the camera 121 of the first body 200 (namely, the two cameras may be implemented to face towards opposing directions, such as front and rear), and may support a different number of pixels (i.e., have a different resolution) than the camera 121 of the first body.

For example, the camera 121 of the first body 200 may operate with a relatively lower resolution to capture an image(s) of the user's face and immediately transmit such image(s) to another party in real-time during video call communication or the like in which reverse link bandwidth capabilities may be limited. Also, the camera 121 of the second body 205 may operate with a relatively higher resolution to capture images of general objects with high picture quality, which may not require immediately transmission in real-time, but may be stored for later viewing or use.

Additional camera related components, such as a flash 250 and a mirror 255, may be additionally disposed adjacent to the camera 121. When an image of the subject is captured with the camera 121 of the second body 205, the flash 250 illuminates the subject. The mirror 255 allows the user to see himself when he wants to capture his own image (i.e., self-image capturing) by using the camera 121 of the second body 205.

The second rear case 235 may further include an audio output module 152. The audio output module 152 may support stereophonic sound functions in conjunction with the audio output module 152 of the first body 200 and may be also used for sending and receiving calls in a speaker phone mode.

A broadcast signal receiving antenna 260 may be disposed (externally or internally) at one side or region of the second rear case 235, in addition to an antenna that is used for mobile communications. The antenna 260 can also be configured to be retractable from the second body 205.

One part of a slide module 265 that allows the first body 200 and the second body 205 to slide relative to each other may be disposed on the first rear case 225 of the first body 200.

The other part of the slide module 265 may be disposed on the second front case 230 of the second body 205, which may not be exposed as shown in FIG. 3.

The second camera 121 and other components may be disposed on the second body 205, but such configuration is not meant to be limited.

For example, one or more of the elements (e.g., 260, 121 and 250 and 152 etc.), which are disposed on the second rear case 235 may be mounted on the first body 200, mainly, on the first rear case 225. In this case, those elements disposed on the first rear case 225 can be protected (or covered) by the second body 205 in the closed configuration. In addition, even if a separate camera is not provided at the second body, the camera module 121 may be configured to rotate (or otherwise be moved) to thus allow image capturing in various directions.

The mobile terminal 100 as shown in FIGS. 1 to 3 may be configured to operate with a communication system, which transmits data via frames or packets, such as wired and wireless communication systems, as well as satellite-based communication systems.

Such communication systems in which the mobile terminal according to the present invention can operate will now be described with reference to FIG. 4.

Such communication systems may use different air interfaces and/or physical layers. For example, air interfaces utilized by the communication systems include example, frequency division multiple access (FDMA), time division multiple access (TDMA), code division multiple access (CDMA), and universal mobile telecommunications system (UMTS), (in particular, long term evolution (LTE)), global system for mobile communications (GSM), and the like. As a non-limiting example, the description hereafter relates to a CDMA communication system, but such teachings apply equally to other types of systems.

Figure 4:
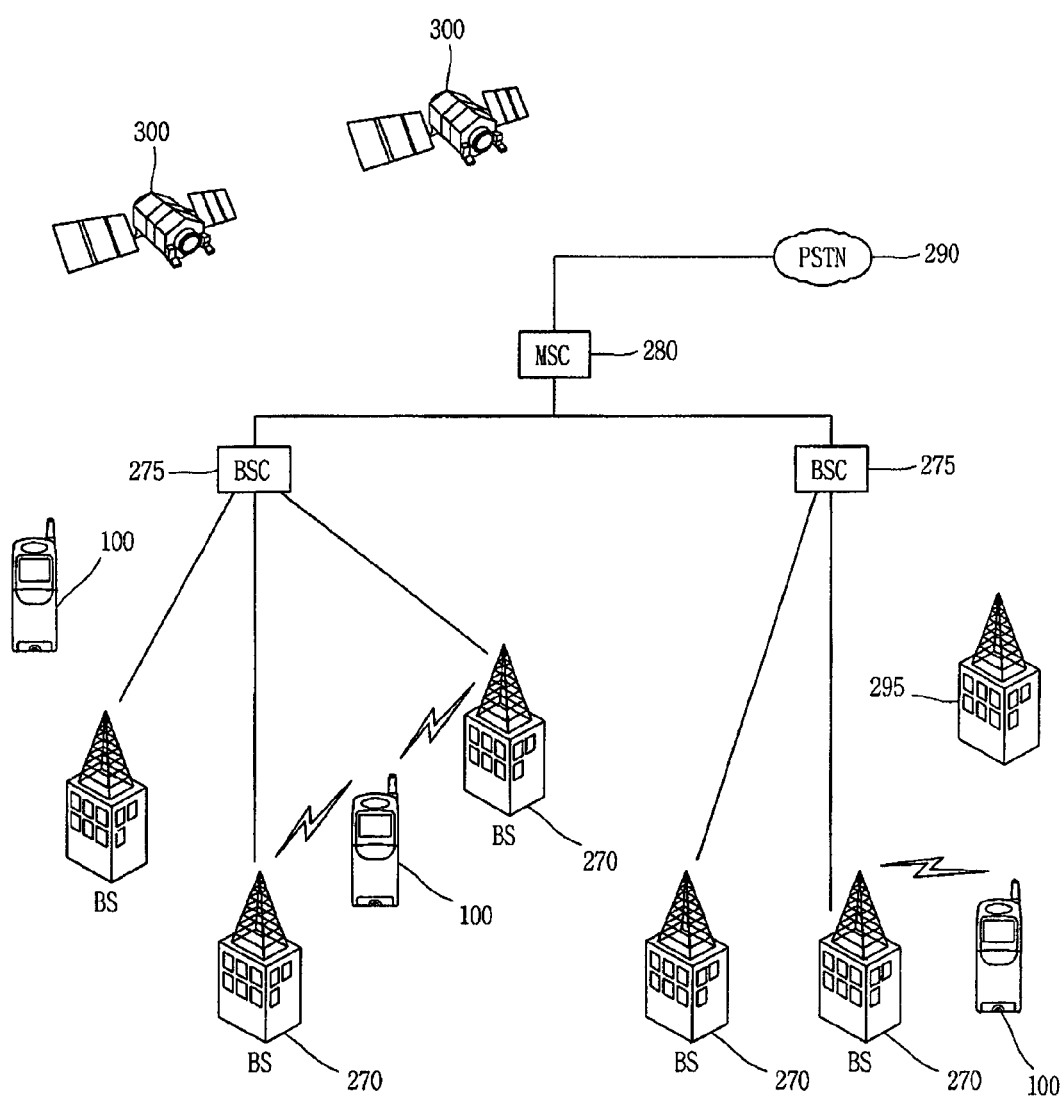
FIG. 4 is a block diagram of a wireless communication system operable with the mobile terminal of FIGS. 1-3.

Referring to FIG. 4, a CDMA wireless communication system may include a plurality of mobile terminals 100, a plurality of base stations (BSs) 270, base station controllers (BSCs) 275, and a mobile switching center (MSC) 280. The MSC 280 is configured to interface with a public switch telephone network (PSTN) 290. The MSC 280 is also configured to interface with the BSCs 275, which may be coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system as shown in FIG. 4 may include a plurality of BSCs 275.

Each BS 270 may serve one or more sectors (or regions), each sector covered by an omni-directional antenna or an antenna pointed in a particular direction radially away from the BS 270. Alternatively, each sector may be covered by two or more antennas for diversity reception. Each BS 270 may be configured to support a plurality of frequency assignments, and each frequency assignment has a particular spectrum (e.g., 1.25 MHz, 5 MHz, etc).

The intersection of a sector and frequency assignment may be referred to as a CDMA channel. The BS 270 may also be referred to as base station transceiver subsystems (BTSs) or other equivalent terms. In such case, the term "base station" may be used to collectively refer to a single BSC 275 and at least one BS 270. The base station may also be referred to as a "cell site". Alternatively, individual sectors of a particular BS 270 may be referred to as a plurality of cell sites.

As shown in FIG. 4, a broadcasting transmitter (BT) 295 transmits a broadcast signal to the mobile terminals 100 operating within the system. The broadcast receiving module 111 as shown in FIG. 1 is provided at the terminal 100 to receive broadcast signals transmitted by the BT 295.

In FIG. 4, several global positioning systems (GPS) satellites 300 are shown. The satellites 300 help locate at least one of a plurality of terminals 100. In FIG. 4, two satellites 300 are depicted, but it is understood that useful positioning information may be obtained with any number of satellites. The GPS module 115 as shown in FIG. 1 is typically configured to cooperate with the satellites 300 to obtain desired positioning information. Instead of or in addition to GPS tracking techniques, other technologies that may track the location of the mobile terminals may be used. In addition, at least one of the GPS satellites 300 may selectively or additionally handle satellite DMB transmissions.

As one typical operation of the wireless communication system, the BSs 270 receive reverse-link signals from various mobile terminals 100. The mobile terminals 100 typically engaging in calls, messaging, and other types of communications. Each reverse-link signal received by a particular base station 270 is processed within the particular BS 270. The resulting data is forwarded to an associated BSC 275. The BSC provides call resource allocation and mobility management functionality including the coordination of soft handoff procedures between BSs 270. The BSCs 275 also route the received data to the MSC 280, which provides additional routing services for interfacing with the PSTN 290. Similarly, the PSTN 290 interfaces with the MSC 280, the MSC interfaces with the BSCs 275, and the BSCs 275 in turn control the BSs 270 to transmit forward-link signals to the mobile terminals 100.

Figure 5:
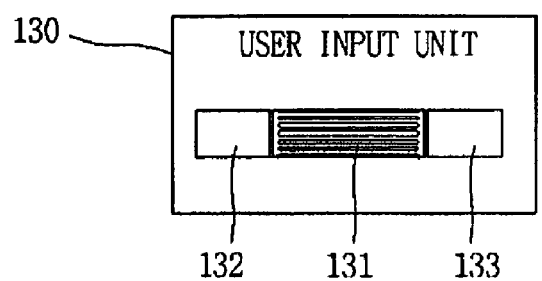
FIG. 5 shows a user input unit according to an embodiment of the present invention.

As described above with reference to FIG. 1, the user input unit 130 generates input data to control the operation of the mobile terminal 100 according to a user manipulation. FIG. 5 shows an example of the user input unit 130 according to an embodiment of the present invention.

As shown in FIG. 5, the user input unit 130 includes a scroll key 131 for displaying and selecting one of a plurality of key groups, and first and second select keys 132 and 133 for selectively inputting desired characters of the respective key groups. Preferably, the characters may include letter, numbers, symbols, and control functions.

When the mobile terminal is not in a character input mode, the scroll key 131 may perform movement between menus and symbols in a standby screen, and when the scroll key 131 is pressed, an indicator such as an antenna icon or a battery icon is displayed for a certain time period. The first select key 132 may be used as a call button for call communication, and the second select key 133 may be operated as a menu key at an initial screen. Moving an indicator on a menu screen is by operating the scroll key 131. When the second select key 133 is pressed for a longer duration, the current screen image is changed to a previous screen image.

The scroll key 131 and the first and second select keys 132 and 133 are mapped to the respective key blocks of a single key group. Thus, if three key blocks form a single key group, a character of the left key block may be selected by the first select key 132, a character of the middle key block may be selected by the scroll key 132, and a character of the right key block may be selected by the second select key 133. Characters included in the respective key blocks may be selected by pressing the corresponding key multiple times.

The scroll key 131 may be disposed on one of a front side, a rear side and the side of the mobile terminal 100. In the present invention, the scroll key 131 is described as an example of a key for sequentially displaying and selecting one of the plurality of key groups, but the present invention is not so limited, and it can be modified to a different form such as a wheel key or up and down direction keys.

In another embodiment, the user input unit 130 may include the single scroll key 131, and select a desired character according to a manipulation direction of the scroll key 131.

Figure 6:
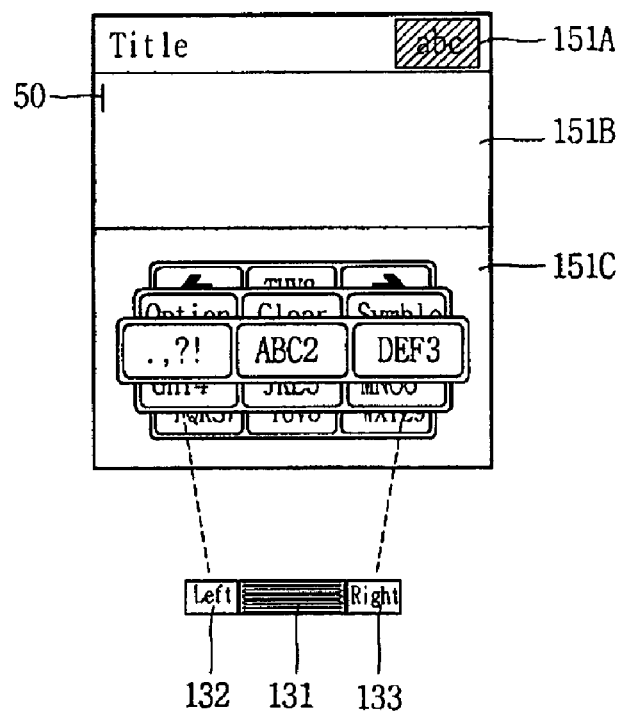
FIG. 6 shows a plurality of key groups and keys mapped to the key groups as displayed on a screen when characters are inputted.

When the mobile terminal is in a character inputting mode, the display unit 151 displays a portion of the plurality of key groups according to manipulation of the scroll key 131 and displays an inputted character. For example, a portion of the plurality of key groups may be displayed in a rolling manner according to the manipulation of the scroll key 131. The display unit 151 may include one or more display regions. As shown in FIG. 6, the display unit 151 includes a region 151A indicating an operation mode of the terminal, a character input region 151B on which inputted characters are displayed, and a key group region 151C on which a portion of the plurality of key groups displayed. The character input region 151B displays actually inputted characters and the key group region 151C displays characters from which a character may be selected.

The memory 160 stores general programs for controlling the mobile terminal 100 and various data. In addition, the memory 180 stores a plurality of key group patterns according to manipulation of the scroll key 131 Three key blocks may form a single key group, and a succession of key groups may be displayed according to the scroll key 131. Each key block may include one or more characters, numbers, symbols, and text functions. In addition, each key group may include the same type of key blocks for the convenience of inputting.

The controller 180 performs a general controlling operation of the mobile terminal such as a voice call, data communication, a video call, and controls operations of each element. The controller 180 maps the plurality of key group patterns stored in the memory 160 and the scroll key 131 and the select keys 132 and 133 according to key manipulation, and displays a selected character on the region 151B of the display unit 151 or performs a selected function.

Namely, the controller selects a key group through a first key manipulation, selects a key block of the group through a second key manipulation, and selects a particular character or function in the key block. Preferably, the first key is a scroll key, and the second key is one of a plurality of buttons.

The scroll key allows a rotation input and push input, and in this case, the rotation can be made through the first key manipulation and the push input can be made as a the second key manipulation. A key block may include a function key in addition to a character key, and performs a movement of direction, a move conversion and other menu functions.

If the user input unit 130 includes the single scroll key 131, the controller 180 maps character patterns according to a manipulation direction of the scroll key 131 based on the character pattern table stored in the memory 160.

The character input method of the mobile terminal according to the present invention will now be described with reference to the accompanying drawings.

In order to input a phone number or create a text message, the user may input a number, letter character, or a symbol. In inputting a phone number, the user may enter a call mode by pressing the first select key 131 or a call button. For creating a text message, the user may enter a character input mode by pressing the second select key 133 at an initial screen.

Figure 7:
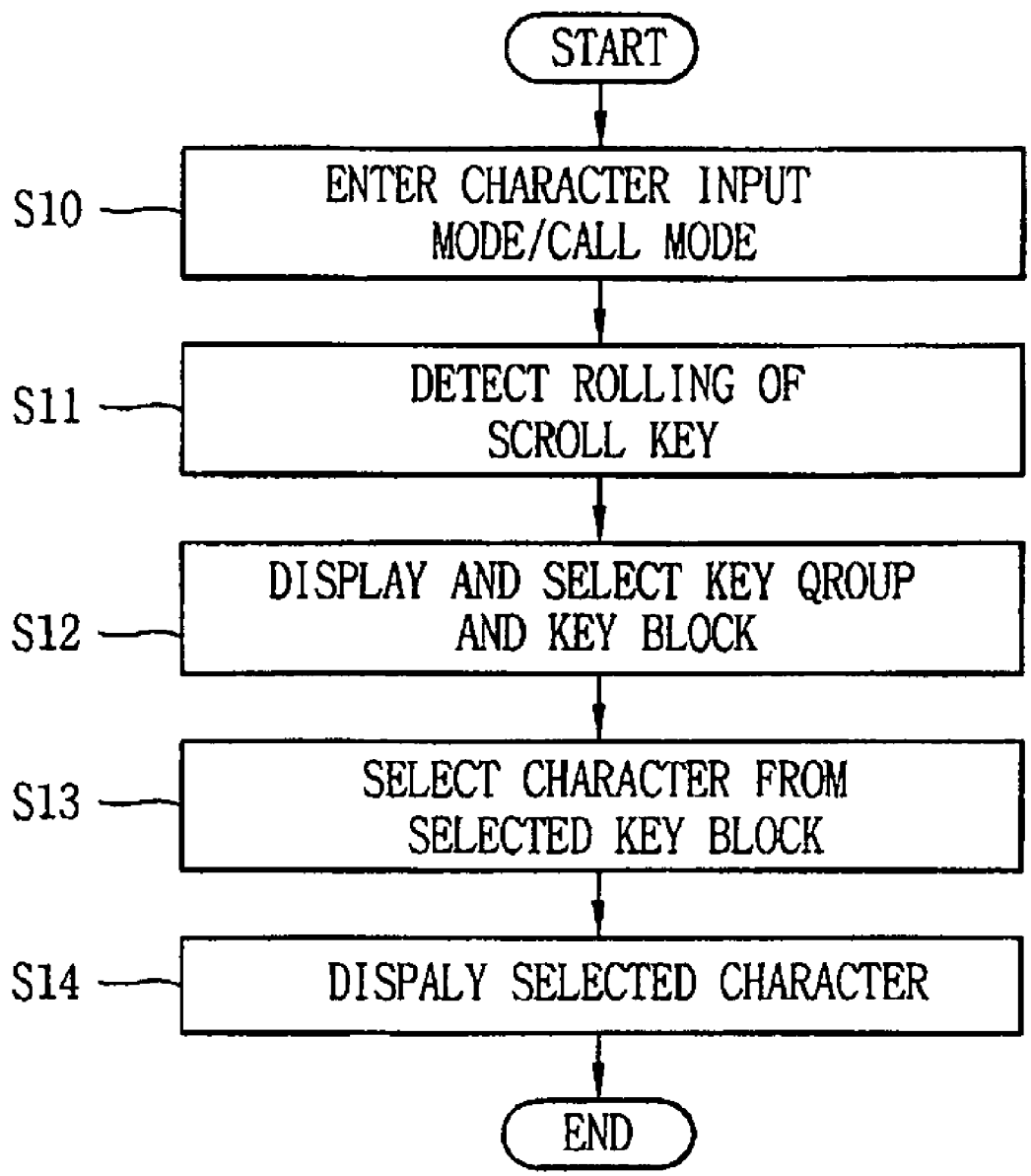
FIG. 7 illustrates the process of a character input method of a mobile terminal according to an embodiment of the present invention.

FIG. 7 is a flow chart illustrating the process of a character input method of a mobile terminal according to an embodiment of the present invention. When the user selects a menu 'send message' by manipulating the second select key 133 and the scroll key 131 of the user input unit 130, or presses the first select key 132 to perform call communication, as shown in FIG. 6, the controller 180 detects the key input, reads a key group pattern stored in the memory 160, displays it on the key group region 152C of the display unit 151, and generates a cursor 50 at the character input region 151B on which characters inputted are actually displayed (S10). In the call mode, information indicating the corresponding mode, state information (remaining battery capacity, time, strength of electromagnetic waves) of the terminal, or the like, may be displayed at the region 151A.

In this state, as shown in FIG. 8, the user may display one of a plurality of key group patterns by rolling the scroll key 131 up or down direction. As mentioned above, each key group is mapped to the scroll key 131, the first, and the second select keys 132 and 133. For example, three key blocks form a single key group, the three key blocks are simultaneously moved according to the scroll key 131, and the left key block is mapped to manipulation of the first select key 132, the middle key block is mapped to a push of the scroll key 131, and the right key block is mapped to manipulation of the second select key 133.

Thus, when the user rolls the scroll key 131 up or down, the controller 180 detects the key manipulation direction and degree, and displays a portion of the plurality of key groups sequentially at the key group region 152C (S11, S12). When a desired key group is displayed, the user stops rolling and performs an operation for actually inputting a character. Such operation is performed by the scroll key 131, and the first and second select keys 132 and 133.

Figure 9:
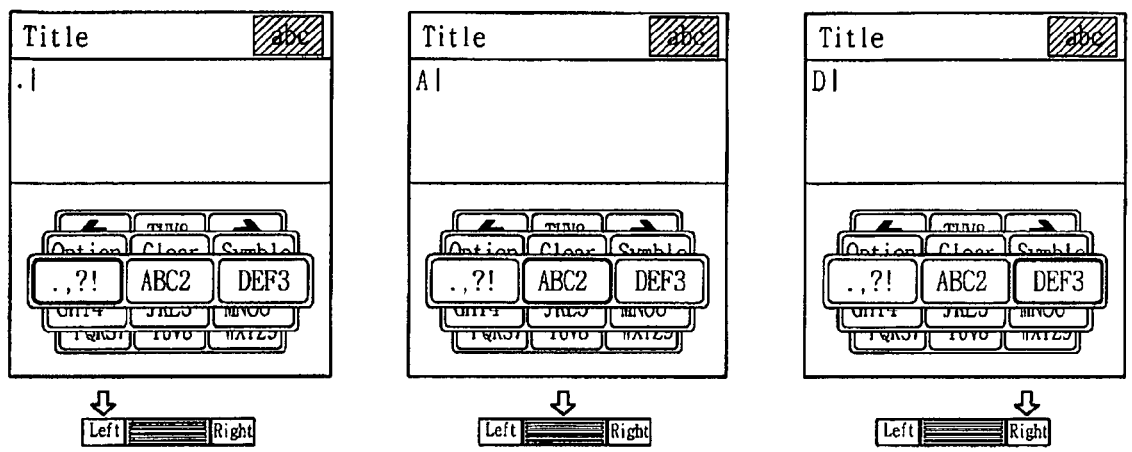
FIG. 9 shows an example of inputting desired characters by selecting a key block from a selected key group in FIG. 8.

When the desired key group is displayed (key group selection) by scrolling the scroll key 131, as shown in FIG. 9, the user may select one of the displayed key blocks by using the scroll key 131 and the first and second select keys 132 and 133. For example, whenever the scroll key 131 and the first and second keys are pressed, the user may move the select indicator one block by one block (key block selection). Then, a first character of the indicated key block is simultaneously displayed on the character input region 151B. In this case, the user selects a desired character from one of the three key blocks by repeatedly pressing the scroll key 131, the first, or the second select keys 132 and 133 (S13). Namely, movement between characters and key input are simultaneously performed. The select indicator may be set as default to be positioned at the middle key block when it is moved by key group by the scroll key 131, and it may be changeable as necessary.

In the selected key group, the first key block includes ' . . . ?1', the second key block includes 'ABC2', and the third key block includes 'DEF3'. Thus, a character of the first key block may be selected by using the first select key 132, a character of the second key block may be selected by pushing the scroll key 131, and a character of the third key block may be selected by using the second select key 133.

Thus, the controller 180 displays characters selected according to the number of times the scroll key 131, the first, or the second select keys 132 and 133 is pressed in the character input region 151B (S14).

Figure 10:
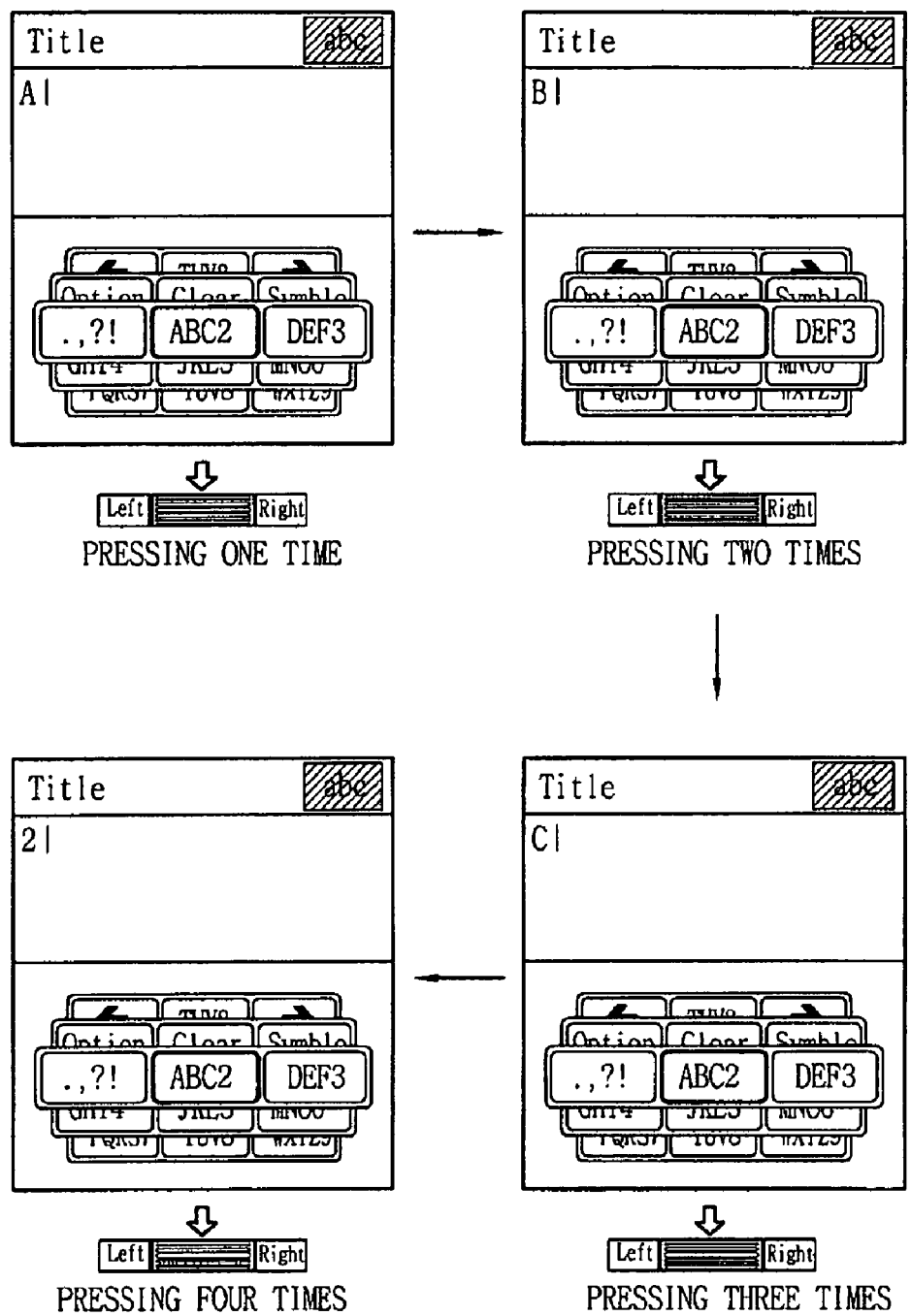
FIG. 10 shows an example of inputting characters of a second key block by using the scroll key.

FIG. 10 shows an example of inputting characters of the second key block by using the scroll key 131.

As shown in FIG. 10, the characters 'ABC2' may be selected by repeatedly pressing the scroll key 131. Namely, when the scroll key 131 is pressed one time, alphabet 'A' may be selected to be inputted, when the scroll key 131 is pressed two times, alphabet 'B' is selected to be inputted, when the scroll key 131 is pressed three times, alphabet 'C' is selected to be inputted, and when the scroll key 131 is pressed four times, the number '2' is selected to be inputted. Namely, the character selection is performed through manipulation of a single key.

In the present invention, the key groups including one or more key blocks are configured to be displayed by manipulating the scroll key 131 and the characters of each key block are selected by using keys mapped to the respective key blocks, thereby allowing a phone number or a text message to be inputted.

Figure 11:
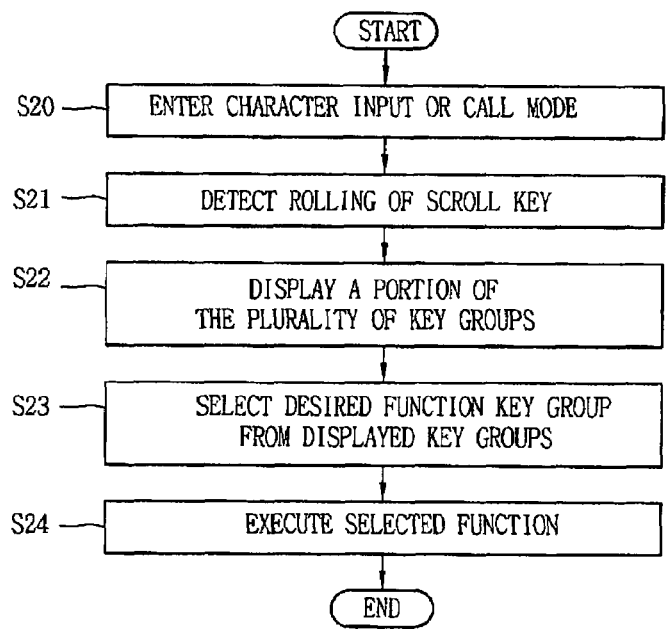
FIG. 11 illustrates the process of a character input method of the mobile terminal according to an embodiment of the present invention.
Figure 12:
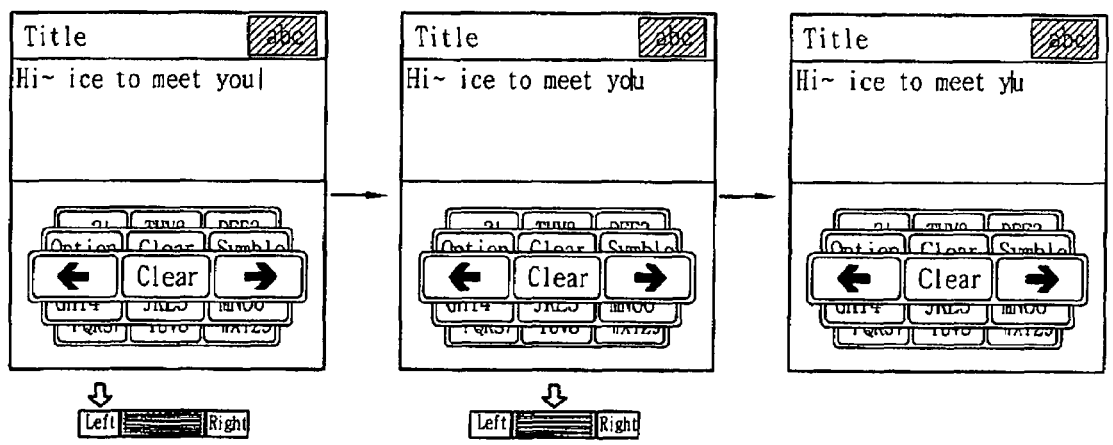
FIG. 12 shows an example of moving a function cursor and deleting characters by selecting a function key block.
Figure 13:
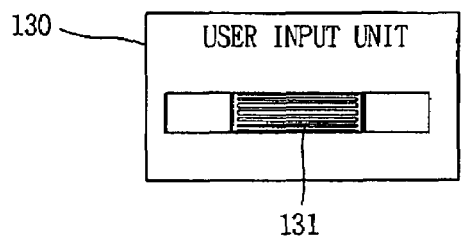
FIG. 13 shows another example of a user input unit according to an embodiment of the present invention.

FIG. 11 illustrates the process of a character input method according to another embodiment of the present invention, in which inputting of characters is controlled by selecting a function key block. FIG. 12 shows an example of moving a function cursor and deleting characters by selecting the function key block.

As stated above, in the present invention, one or more key blocks form a single key group, and each key block may include characters to be inputted or text functions. Each key group includes the same type of key blocks for the convenience of inputting. For example, the key groups may be configured by discriminating key blocks for inputting characters and key blocks for performing functions (clear, cursor movement, option, symbol, etc.).

As shown in FIG. 11, when the user enters a 'send message' menu or a character input menu (S20), the controller 180 detects a key input, displays an initial key group pattern at the key group region 151C and generates a cursor 50 at the character input region 151B (S20).

In this state, when the user manipulates the scroll key 131, the controller 180 detects a key manipulation direction and manipulation degree, and sequentially displays a portion of the plurality of key groups on the display unit 151.

When a desired function key group is displayed and selected by rolling the scroll key 131 (S23), the user selects a function key block of the selected function key group by using the scroll key 131, the first, or the second select keys 132 and 133 to perform a corresponding function (S24).

For example, as shown in FIG. 12, the user selects a function key group handling a cursor movement function by manipulating the scroll key 131, and selects each function key block of the selected key group by using the first select key 132, the scroll key 131, or the second select key 133 to perform cursor movement and character deletion. Namely, when the first select key 132 is pressed one time, the cursor is moved one space to the left, and when the scroll key 131 is pressed, 'clear' mapped to the scroll key is operated to delete 'o' of 'you'.

In the present invention, operations for a text function can be performed in the same manner as described above.

In the present invention, text and number inputting can be performed by using only five inputs that perform the navigation (four direction inputs) and confirmation functions. This can be applicable to both the general 5 direction keys (left, right, up, down, OK), and the user input unit having a scroll wheel.

Figure 14:
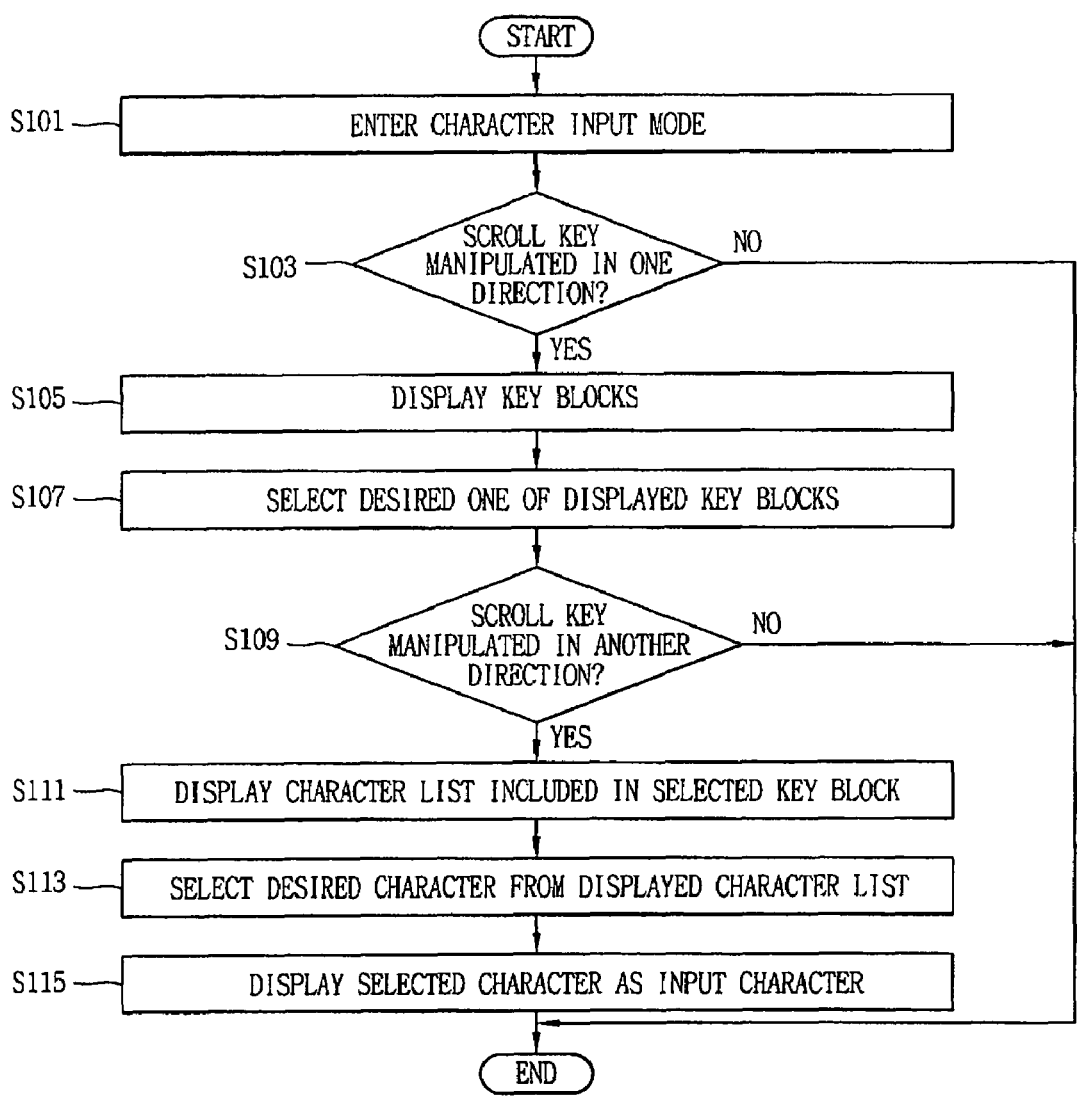
FIG. 14 illustrates the process of a character input method of the mobile terminal when a text message is created according to an embodiment of the present invention.

FIG. 14 shows another example of the user input unit 130 which includes only a single scroll key 131 to select a character pattern and a character. The user input unit 130 may have a function key to execute a character input function using the scroll key 131. The scroll key 131 may be disposed on one of the front side, the rear side and the side of the mobile terminal 100. In the present invention, the scroll key 131 is described to be used as a key for inputting characters, but the present invention is not limited thereto, and it can be modified to a key of a different form such as a jog wheel or direction keys.

Figure 15:
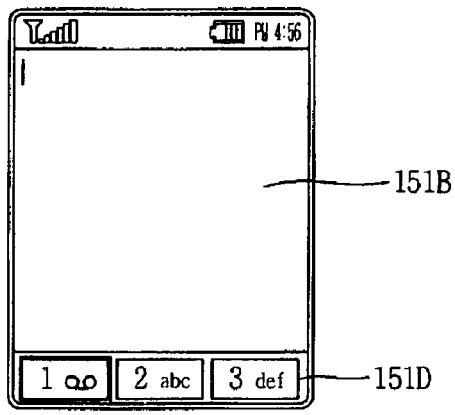
FIG. 15 shows a screen display illustrating selection of a key block by using the scroll key in FIG. 14.

In this case, the display unit 151 may include one or more display regions as shown in FIG. 6, and includes a key block region 151D instead of the key group region 151C (see FIG. 15).

The memory 180 may store a character pattern table according to the direction of manipulation of the scroll key 131. The character pattern table includes a manipulation direction of the scroll key and character pattern information according to a character type. Here, the character type includes letters, numbers, symbols, and text functions.

The method of inputting characters by using the single scroll key 131 will now be described.

Character inputting can be divided into a case where only numbers are inputted and a case where letters or characters and symbols as well as numbers, are inputted. Placing a call is an example of a case in which only numbers are inputted, and composing a text message is an example of a case in which a combination of letters or characters, numbers, and symbols are inputted.

FIG. 14 illustrates the process of composing a text message according to the present invention.

The controller 180 controls the display unit 151 to display a message creation screen image at the character input region 151B, and to move the cursor 50 to a character input window within the character input region 151B (S101). Namely, the controller 180 converts the operation mode of the mobile terminal 100 into a character input mode.

When manipulation of the scroll key 131 is detected, the controller determines the direction of the scroll key 131 and displays a character pattern according to the direction at the key block region 151D. In other words, when the scroll key 131 is rotated in an upward direction, as shown in FIG. 15, the controller 180 displays key blocks each including both letters and a number at the key block region 151D (S103, S105). One or more key blocks are displayed at the key block region 151D.

Thereafter, the user manipulates the scroll key 131 in the same direction, namely, in the upward direction to move to a desired key block (S107). In this case, the controller 180 moves a select indicator (e.g., cursor) to indicate a selected key block. When the scroll key 131 is rotated a given amount, the next key block is selected. For example, whenever the scroll key 131 is rotated 30° in the upward direction, the select indicator is moved to the next key block.

Figure 17:
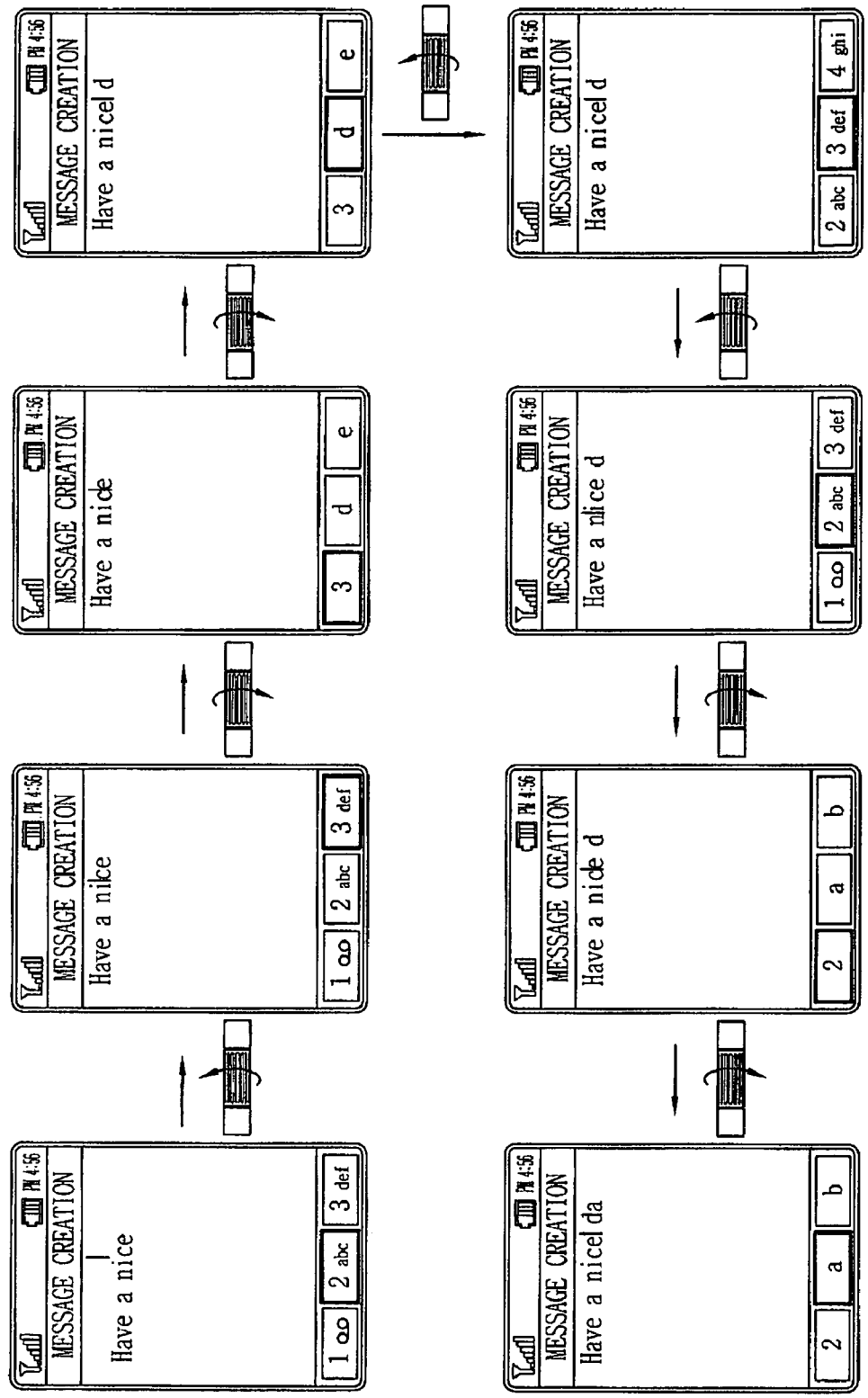
FIG. 17 shows screen displays illustrating inputting of characters by stages by using the scroll key in FIG. 14.

When the select indicator has been moved to the desired key block by manipulating the scroll key 131 (key block selection) in an upward direction, the user manipulates the scroll key 131 in a downward direction to display a character list of the selected key block (S109, S111). For example, as shown in FIG. 17, when the scroll key 131 is manipulated in the downward direction while the key block '3' is selected, the controller 180 displays one or more characters of the selected character list in the key block region 151D.

In this embodiment, the case where the three characters or key blocks are displayed at the key block region 151D is taken as an example, but the number of displayed characters and key blocks can be established through a menu setting (not shown).

With the character list displayed at the key block region 151D, when the user manipulates the scroll key 131, the controller moves the select indicator in units of characters according to manipulation of the scroll key 131. When the select indicator has moved to a desired character, the user selects the characters desired to be inputted by pressing the scroll key 131 (S113). The controller 180 displays the selected character in the character input window of the character input region 151B (S115). Here, the select indicator visually indicates that selection has been made. For example, the select indicator may magnify and display the selected character, or displays edges or the like.

In this embodiment, the case where the character desired to be inputted is selected by pressing the scroll key as an example, but without being so limited, the 'OK' key may be pressed instead of the scroll key to select an input character, or an input character may be automatically selected to be displayed at the character input region 151B after the lapse of a certain time period.

Thereafter, as shown in FIG. 17, when the key blocks are displayed by rotating the scroll key 131 in the upward direction, a desired key block is selected from among the key blocks, and then, when the scroll key 131 is rotated in the downward direction, a character list included in the corresponding key block is displayed. When a desired character is selected from the displayed character list, the corresponding character is displayed as an input character. This operation is repeatedly performed to create a text message.

When the creation of the text message is completed, the controller 180 transmits the corresponding text message to a recipient (receiver) via the wireless communication unit 110.

Figure 16:
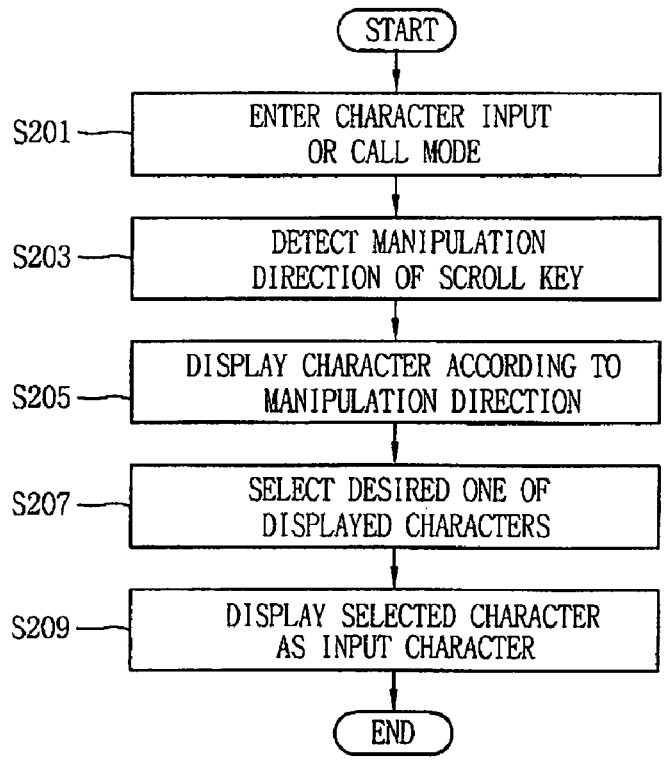
FIG. 16 illustrates the process of a character input method of the mobile terminal in making a phone call according to another embodiment of the present invention.

A character input method of the mobile terminal in making a call will now be described. FIG. 16 is a flow chart illustrating the process of the character input method of the mobile terminal in making a phone call according to another embodiment of the present invention.

The user manipulates a function key for executing call mode for inputting a phone number, and the controller enters to the character input mode according to the user input (S201). At this time, the controller controls the display unit 151 to display a character input screen image in the character input region 151B.

While in the character input mode, the controller 180 detects manipulation of the scroll key 131 (S203), and displays one of an odd number and an even number at the key block region 151D according to a manipulation direction of the scroll key 131 (S205).

For example, when the scroll key 131 is manipulated in the upward direction, the odd numbers (1, 3, 5, 7) are displayed at the key block region 151D, and when the scroll key 131 is manipulated in the downward direction, the even numbers (2, 4, 6, 8) at the key block region 151D.

When the user continuously manipulates the scroll key 131 in the same direction, the controller 180 moves the select indicator to select the desired character (S207). Then, the controller 180 then displays the selected character as an input character in the character input region 151B.

Figure 18:
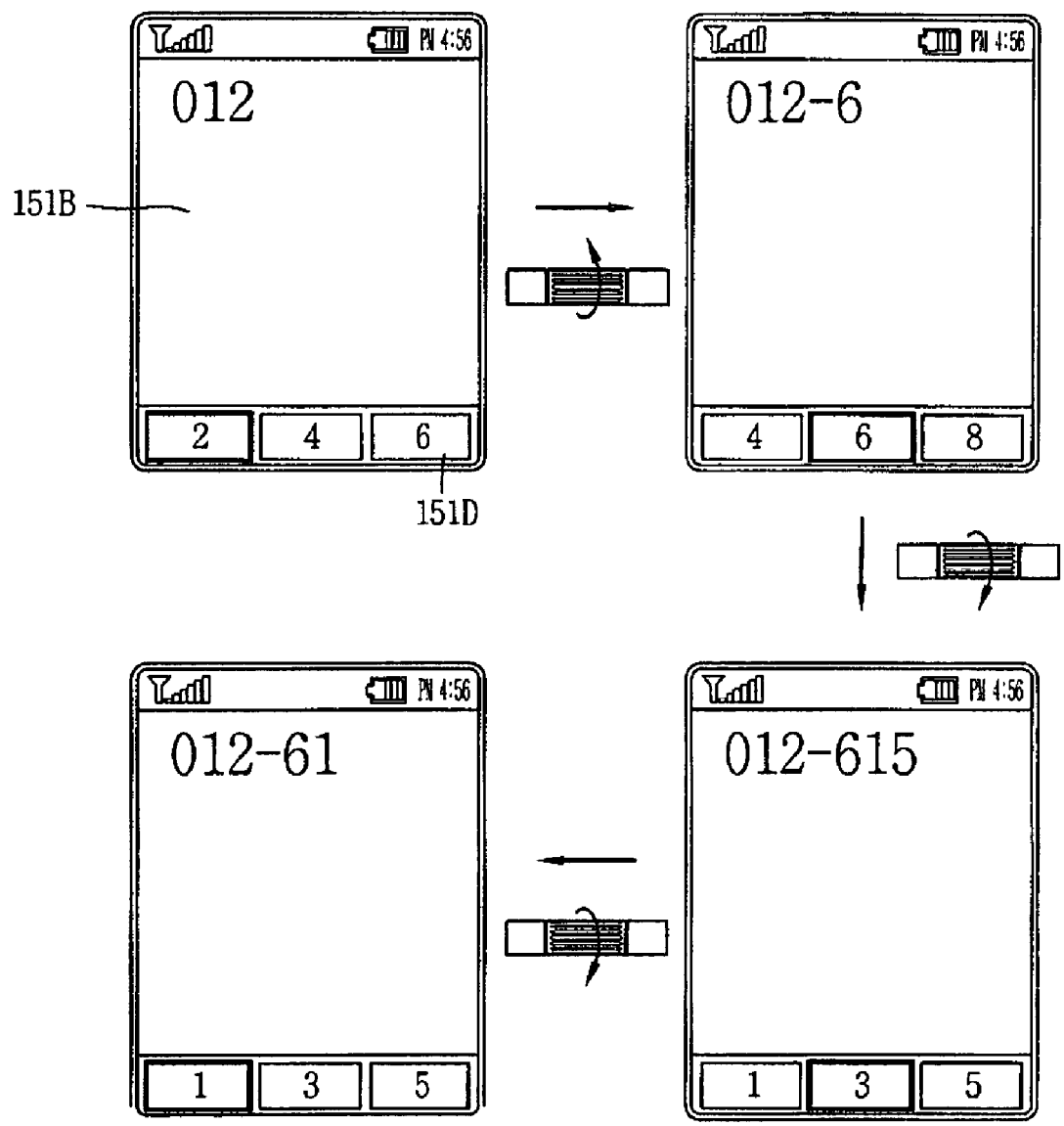
FIG. 18 shows screen displays illustrating inputting of a phone number by using the scroll key in FIG. 17.

For example, as shown in FIG. 18, with the select indicator positioned at '2', when the user manipulates the scroll key 131 in the same direction, the controller 180 moves the select indicator to '6'. When the user has moved the select indicator to the desired number, when the user selects the 'OK' key, the controller 180 displays '6' in the character input region 151B.

Next, when the user manipulates the scroll key 131 in the opposite direction to input a number, the controller 180 displays odd numbers at the key block region 151D. Then, the user keeps manipulating the scroll key 131 in the same direction to move the select indicator sequentially displaying numbers in the key block region 151D. After the select indicator moves to the desired number, and the corresponding number is selected, the selected number is displayed at the character input region 151B.

When the inputting of a phone number is completed as described above, the user manipulates a call key to place the call.

Figure 19A:
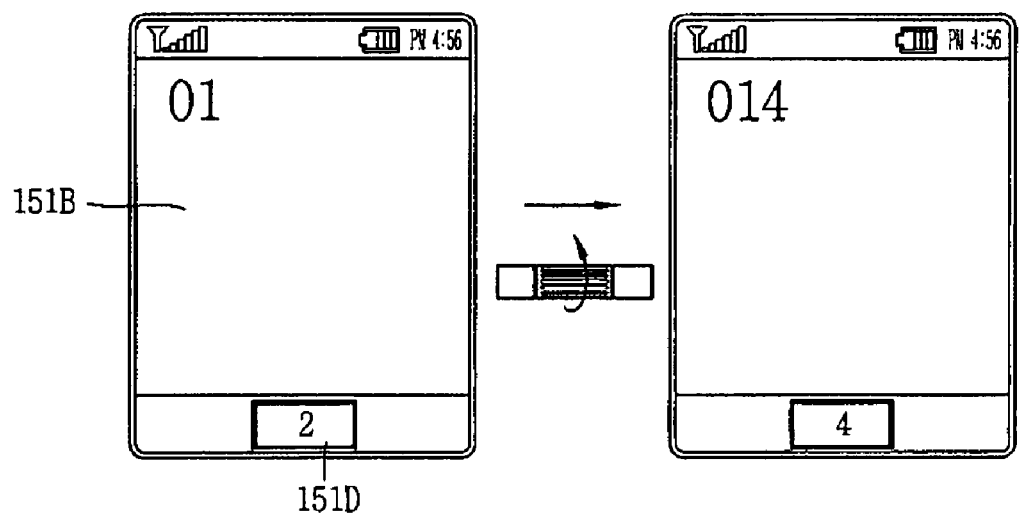
FIGS. 19a and 19b shows screen displays illustrating inputting of a phone number by using the scroll key according to another embodiment of the present invention.

In this embodiment, one or more character lists and the key blocks are displayed in the key block region 151D is an example, but as shown in FIG. 19a, whenever the scroll key is rotated, numbers may be sequentially displayed in the key block region 151D. For example, referring to FIG. 19A, when even numbers are displayed when the scroll key 131 is operated in the upward direction, if the scroll key is continued to be manipulated in the upward direction, first a '2' is displayed, then a '4' is displayed.

Figure 19B:
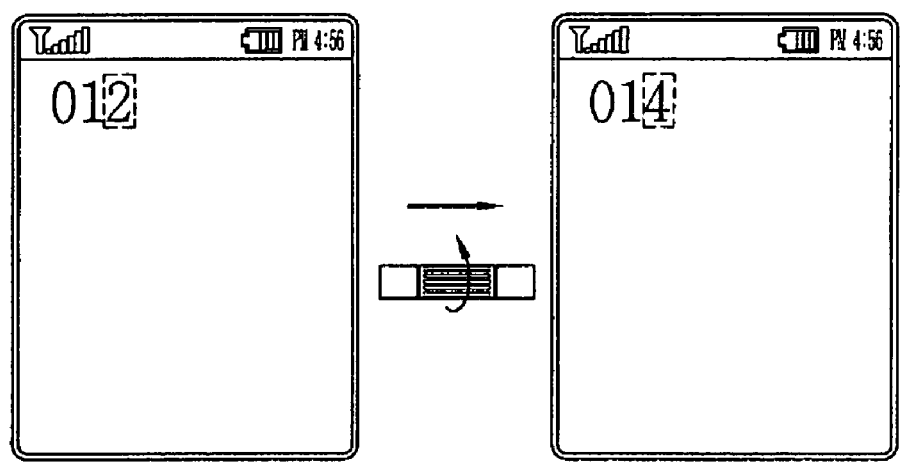

Alternatively, as shown in FIG. 19b, a number may be displayed in the display region 151B. For example, when '1' is inputted, if the scroll key 131 is manipulated to input the next character, the number '2' is displayed according to the corresponding manipulation direction. When the scroll key 131 is manipulated in the same direction, the next number '4' is displayed. When the user inputs the 'OK' key or after a specified time period, the displayed number finally is inputted automatically, and the cursor is moved to a position for inputting a next character.

Figure 20:
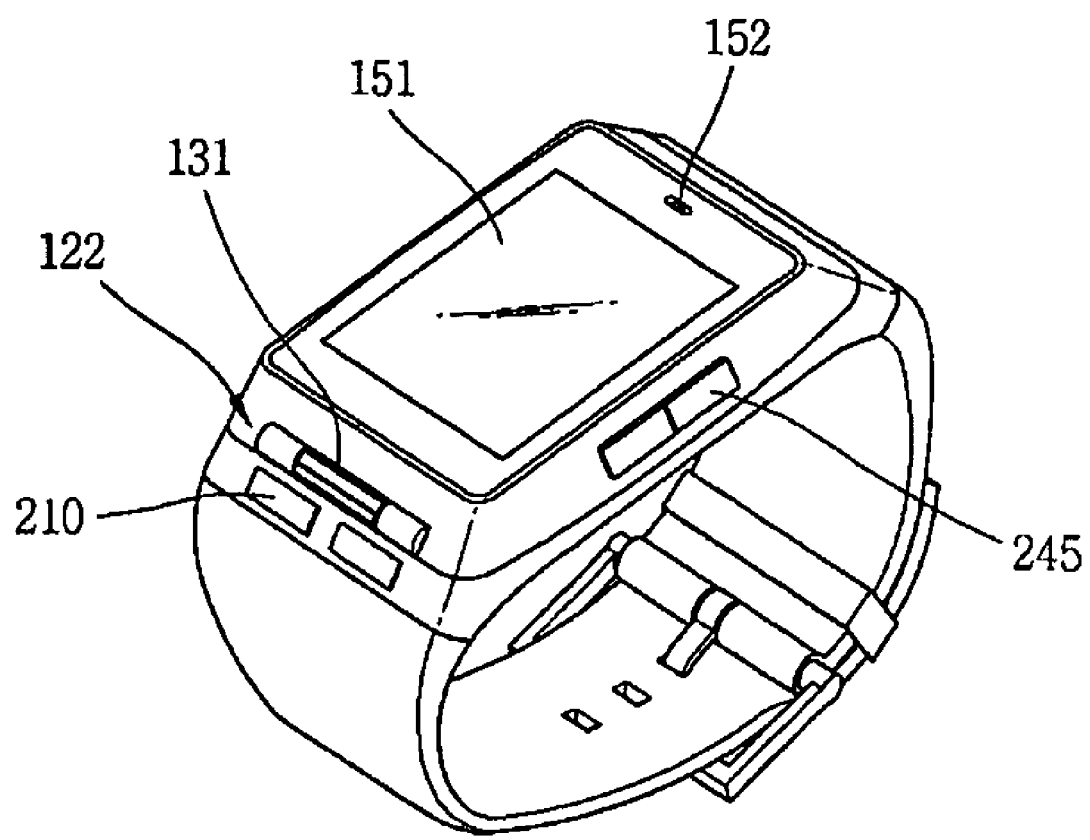
FIG. 20 is a front perspective view of a watch phone according to an embodiment of the present invention.

In the embodiments as described above, the slide phone has been described as an example, but as shown in FIG. 20, the present invention can be also applicable to the ultra-compact device such as a watch phone that cannot have a dedicated keypad because of size restrictions.

In the embodiments of the present invention, the above-described method can be implemented as codes that can be read by a computer in a program-recorded medium. The computer-readable medium includes various types of recording devices in which data read by a computer system is stored. The computer-readable medium may include a ROM, a RAM, a CD-ROM, a magnetic tape, a floppy disk, an optical data storage device, and the like. The computer-readable medium also includes implementations in the form of carrier waves or signals (e.g., transmission via the Internet). The computer may include the controller 180 of the terminal.

As described above, the present invention has the following advantages. Because text and number inputting can be performed by using only a scroll key and a first and a second select key, an ultra-compact mobile terminal accurately and conveniently perform the character input function.

In addition, a character input method using a single scroll key requires using only one finger. The present invention may be applicable to an ultra-compact mobile terminal without being limiting to the size of the mobile terminal.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
a memory configured for storing a plurality of key groups wherein each of the plurality of key groups comprises a plurality of key blocks and wherein each of the plurality of key blocks comprises at least one character;
a user input unit configured for generating key input data;
a controller configured for selecting a key group of the plurality of key groups, selecting a key block of the plurality of key blocks associated with the selected key group, and selecting a character of the at least one character of the selected key block according to the key input data; and
a display unit configured for displaying the plurality of key groups such that the display of a first key group of the plurality of key groups partially overlaps the display of at least a second key group of the plurality of key groups,
the display unit configured for displaying the displayed plurality of key blocks of each of the plurality of key groups moving simultaneously according to the key input data.

2. The mobile terminal of claim 1, wherein the user input unit comprises a scroll key, a left selection key, and a right selection key.

3. The mobile terminal of claim 2, wherein the scroll key is operable in an up rotational direction, a down rotational direction, and a push direction.

4. The mobile terminal of claim 3, wherein operating the right selection key displays a menu screen when the mobile terminal is not in a character input mode and then operating the scroll key in the up rotational direction or the down rotational direction moves an indicator on the menu screen.

5. The mobile terminal of claim 3, wherein the left selection key is used to initiate a call communication and operating the scroll key in the push direction displays an indicator showing a state of the mobile terminal on the display unit when the mobile terminal is not in a character input mode.

6. The mobile terminal of claim 3, wherein operating the scroll key in the up rotational direction or the down rotational direction displays and selects one of the plurality of key groups.

7. The mobile terminal of claim 3, wherein operating the left selection key, operating the scroll key in the push direction, or operating the right selection key selects one of the plurality of key blocks associated with the selected key group.

8. The mobile terminal of claim 7, wherein one character of the at least one character of the selected one of the plurality of key blocks is selected according to a plurality of operations of the left selection key, the scroll key in the push direction, or the right selection key.

9. The mobile terminal of claim 1, wherein the plurality of key blocks are divided into key blocks for inputting characters and key blocks for performing text functions.

10. The mobile terminal of claim 9, wherein the characters comprise letters, numbers, symbols, punctuation marks, and text functions.

11. The mobile terminal of claim 1, wherein the controller is further for selecting one of the plurality of key groups through a manipulation of a first key, selecting one of the plurality of key blocks associated with the selected one of the plurality of key groups through a manipulation of a second key, and selecting one of the at least one character of the selected one of the plurality of key blocks according to a plurality of manipulations of the second key.

12. The mobile terminal of claim 11, wherein:
the manipulation of the first key is a rotational input of a scroll wheel; and
the manipulation of the second key is a pressing of a first selection key, a pressing of a second selection key, or a push input of the scroll wheel.

13. The mobile terminal of claim 11, wherein:
the plurality of key blocks further comprise symbols for text functions and at least one character key; and
the text functions comprise cursor direction movement, character deletion, mode conversion, and menu functions.

14. A method for inputting characters of a mobile terminal, the method comprising:
entering a character input mode;
displaying a plurality of key groups comprising displaying a first key group of the plurality of key groups overlapping a display of at least a second key group of the plurality of key groups, each of the plurality of key groups comprising a plurality of key blocks, and each of the plurality of key blocks comprising at least one character;
simultaneously moving the plurality of key blocks of each of the displayed plurality of key groups according to a manipulation of a user input unit; and
inputting one character of the at least one character of one of the plurality of key blocks according to a manipulation of the user input unit, the user input unit comprising a scroll key, a left selection key, and a right selection key.

15. The method of claim 14, wherein simultaneously moving the plurality of key blocks of each of the displayed plurality of key groups is performed according to an up rotational direction or a down rotational direction of the scroll key.

16. The method of claim 14, further comprising selecting one of the plurality of key blocks associated with one of the displayed plurality of key groups by operating the left selection key, operating the scroll key in a push direction, or operating the right selection key.

17. The method of claim 14, further comprising selecting and displaying one character of the at least one character of the one of the plurality of key blocks according to a plurality of operations of the left selection key, the scroll key in a push direction, or the right selection key.

18. The method of claim 14, wherein the plurality of key blocks are for inputting the characters or for performing text functions.

19. The method of claim 18, wherein the characters comprise letters, numbers, symbols, punctuation marks, and text functions.

20. The method of claim 14, wherein inputting the one character comprises:
- selecting one of the displayed plurality of key groups through a manipulation of a first key;
- selecting the one of the plurality of key blocks associated with the selected one of the displayed plurality of key groups through a manipulation of a second key; and
- selecting one of the at least one character of the selected one of the plurality of key blocks according to a plurality of manipulations of the second key.

21. The method of claim 20, wherein:
- the manipulation of the first key is a rotational input of a scroll wheel; and
- the manipulation of the second key is a pressing of a first selection key, a pressing of a second selection key, or a push input of the scroll wheel.

22. The mobile terminal of claim 20, wherein:
- the plurality of key blocks include symbols for text functions and at least one character key; and
- the text functions comprise cursor direction movement, character deletion, mode conversion, and menu functions.

23. A mobile terminal comprising:
- a memory for storing a character pattern table;
- a user input unit comprising a scroll key for selecting a character to be inputted; and
- a controller for displaying characters by mapping the characters to the character pattern table according to a manipulation direction of the scroll key when the mobile terminal is in a character input mode, and displaying a selected one of the characters on a display unit,
- wherein when the scroll key is manipulated in a first direction, the controller displays odd numbers, and when the scroll key is manipulated in a second direction, the controller displays even numbers.

24. The mobile terminal of claim 23, wherein when the scroll key is manipulated in the first direction, the controller selects and displays a key block, and when the scroll key is manipulated in the second direction, the controller displays a character list for the selected key block.

25. The mobile terminal of claim 23, wherein the display unit includes a first display region for displaying the selected character and a second display region for displaying a plurality of characters mapped according to the manipulation direction of the scroll key.

26. The mobile terminal of claim 25, wherein the second display region is implemented as a pop-up window.

27. A character input method of a mobile terminal, the method comprising:
- displaying a plurality of characters by mapping the characters to a character pattern table according to a direction in which a scroll key manipulated in a character input mode; and
- selecting one of the displayed plurality of characters,
- wherein displaying the plurality of characters comprises displaying odd numbers when the scroll key is manipulated in a first direction and displaying even numbers when the scroll key is manipulated in a second direction.

28. The method of claim 27, wherein displaying the plurality of characters comprises:
- displaying a plurality of key blocks when the scroll key is manipulated in the first direction, wherein each of the plurality of key blocks comprises at least one character;
- selecting one of the displayed key blocks; and
- displaying a character list mapped to the selected key block when the scroll key is manipulated in the second direction.

29. The method of claim 27, wherein selecting one of the displayed characters comprises:
- positioning a select indicator to one of the displayed characters according to the scroll key manipulation direction; and
- selecting the character indicated by the select indicator.

30. The method of claim 29, wherein the select indicator is a symbol used for designating one of the displayed characters.

* * * * *